United States Patent Office 3,479,517
Patented Nov. 18, 1969

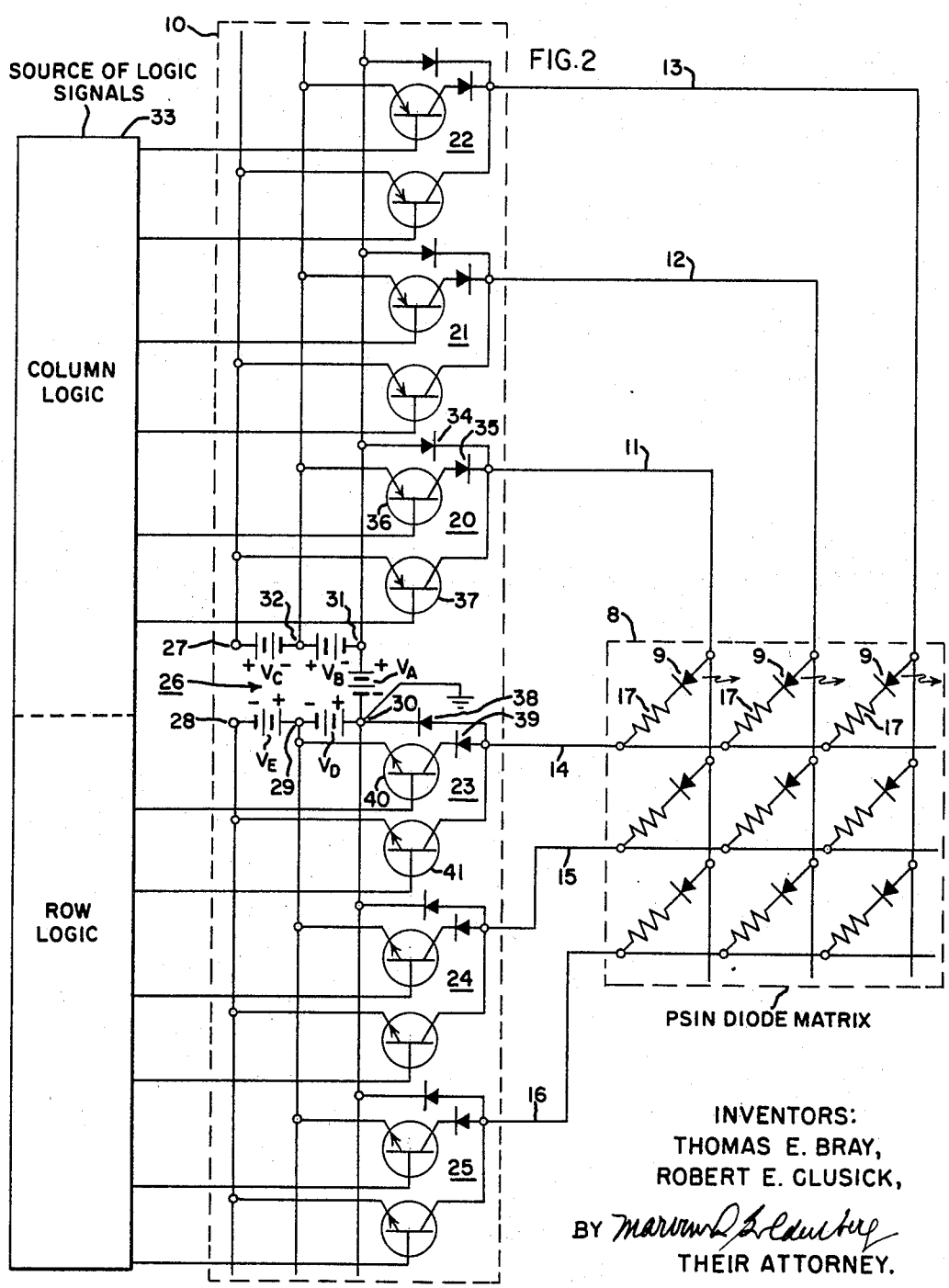

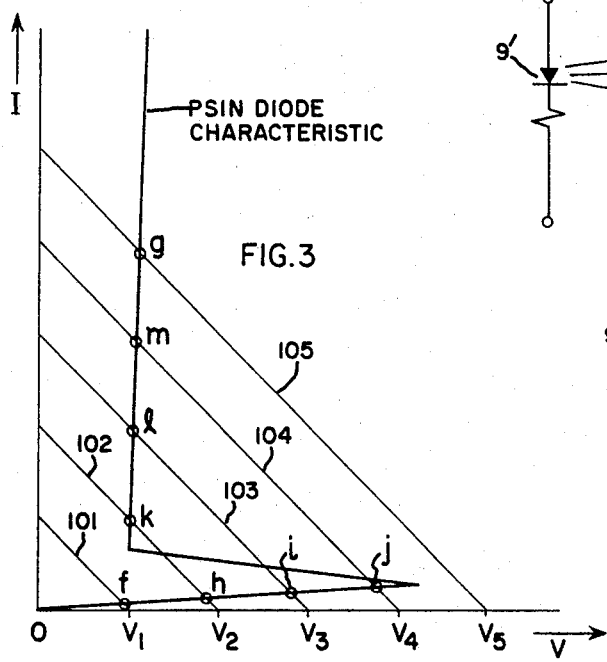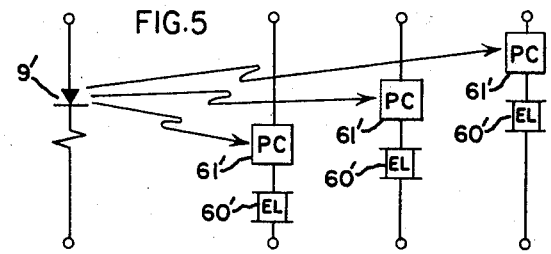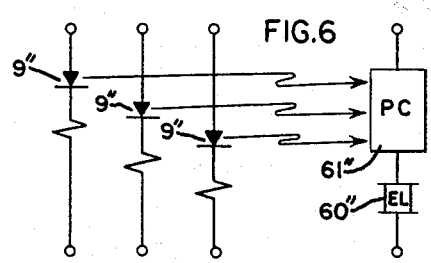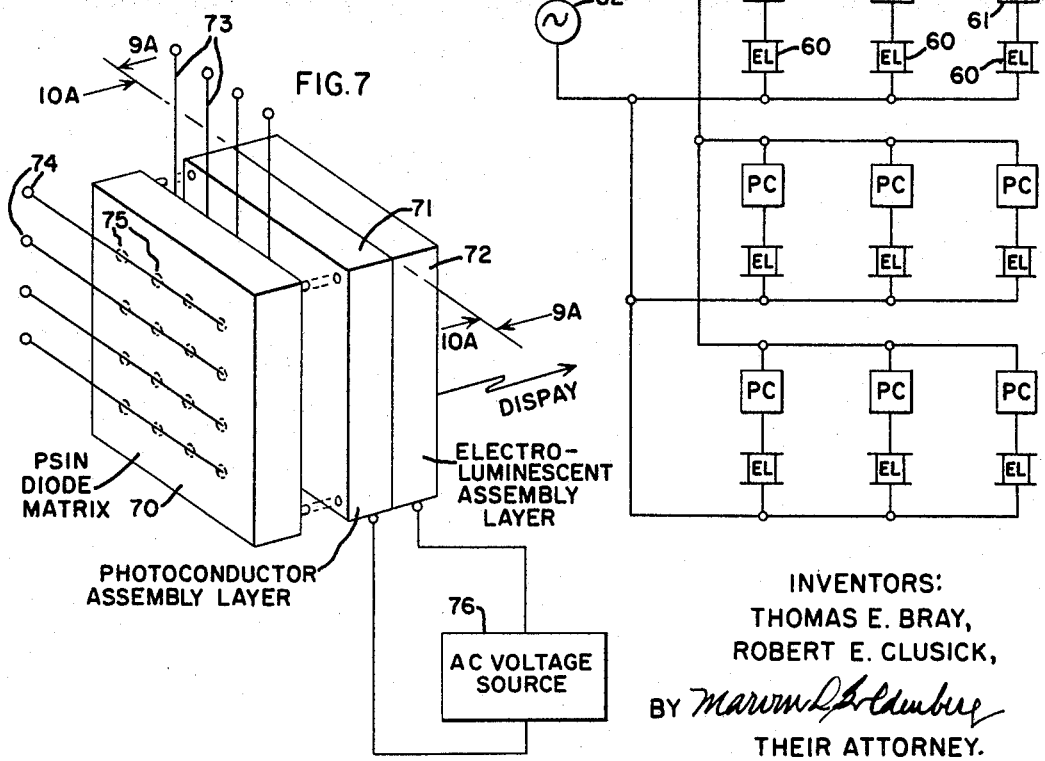

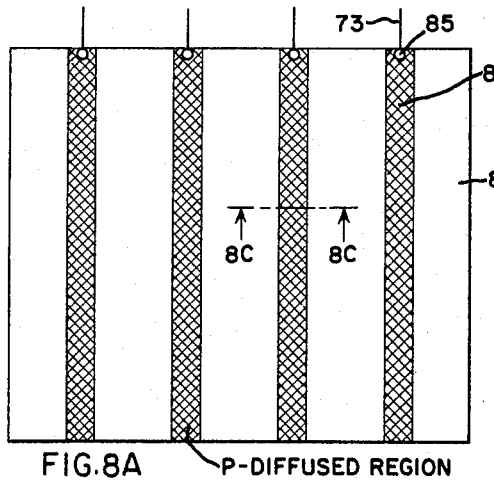
FIG.8A  P-DIFFUSED REGION
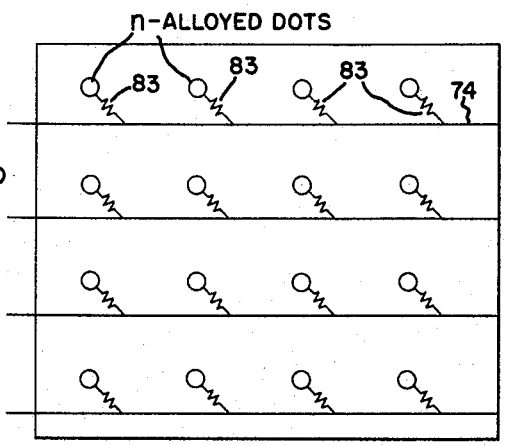
FIG.8B
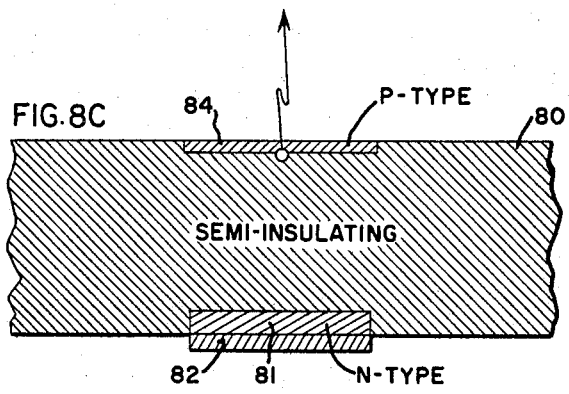
FIG.8C
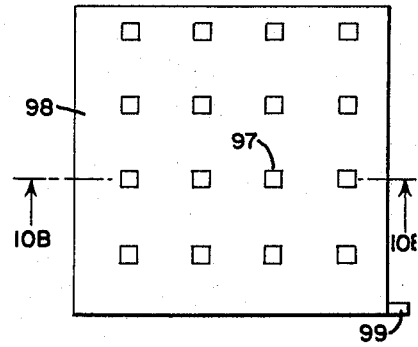
FIG.10A
FIG.10B
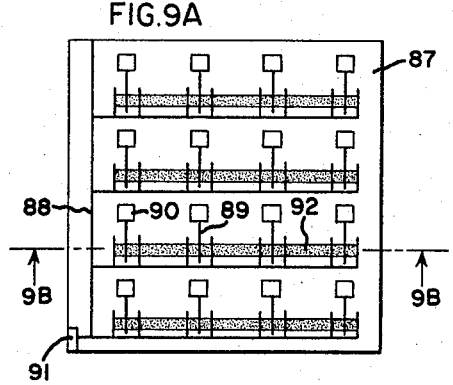
FIG.9A
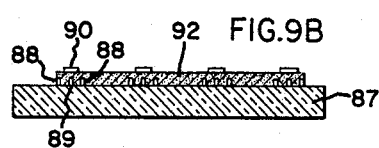
FIG.9B
INVENTORS:
THOMAS E. BRAY,
ROBERT E. CLUSICK,
BY Marvin Goldenberg
THEIR ATTORNEY.

3,479,517
SOLID STATE LIGHT EMITTING DISPLAY WITH MEMORY
Thomas E. Bray, Clay, and Robert E. Clusick, North Syracuse, N.Y., assignors to General Electric Company, a corporation of New York
Filed Oct. 17, 1966, Ser. No. 587,318
Int. Cl. H01j *31/50*
U.S. Cl. 250—213                    9 Claims

ABSTRACT OF THE DISCLOSURE

A solid state display comprising a matrix of bistable light emitting diode elements optically coupled to an array of light emissive-photoresponsive elements, electrical input signals applied to said matrix for selectively operating said diode elements in a first light emissive state or a second non light emissive state and thereby controlling the light output of said light emissive-photoresponsive elements.

---

The present invention relates generally to solid state displays. In particular, the invention relates to a novel display which includes an array of solid state light emissive elements, the light output of which is individually controlled in response to electrical signal information, and the like.

Solid state displays comprising an array of light emissive elements for producing light images on a point by point basis are well known to the art. The salient advantages of these displays are that they require small amounts of power and are compatible with a microelectronic circuit fabrication. Within the present state of the art, solid state displays have been used as light image amplifiers, image converters and, or storage devices. For such applications each of the light emitters are individually coupled with a photoresponsive means which respond to a given applied light image, the light emitters being controlled by said photoresponsive means to provide a light output corresponding to the applied light image. Storage of the displayed image may be provided by a feedback light coupling from the light emissive elements to the associated photoresponsive elements.

In a further application, a coded light signal, as from a bank of electroluminescent cells, is employed to actuate the photoresponsive means through a decoding mask for providing an alphanumeric display. Several systems of this nature are described in an article entitled "Electroluminescent Displays for Logic Devices" by I. Greenberg, appearing in Electronics, Mar. 24, 1961.

The above described systems may be appreciated to be useful for displaying and storing applied light information or a limited form of electrical information. However, they do not have the ability to provide a matrix controlled display such as would be required for television type picture displays or comparable computer displays. Thus, by a matrix controlled display it is meant one wherein the emission state of each light emissive element can be selectively controlled by the application of a pair of input signals having generally an X-Y designation, and in which said light emissive elements are normally arranged in a column-row configuratio, although not necessarily limited to such uniform arrangement. The construction of electroluminescent or comparable display elements, per se, into a matrix configuration using present day materials and techniques has been found to present a number of difficulties. The threshold properties of the elements are relatively poor so that cross talk is difficult to avoid. In addition, without a memory function, there exists an inherent brightness limitation. There exist, further, relatively large power requirements and a corresponding speed limitation.

In order to circumvent some of the above noted difficulties, workers in the art have employed the display elements in electrical circuit with various control elements in attempting to provide a matrix controlled display. None of these efforts have been totally satisfactory. For example, ferroelectric-electroluminescent displays have been developed. These, however, necessitate extremely complex electronics at each matrix intersection. Further, for the memory operation, they require large amounts of power and have a relatively slow response. In another recent development piezoelectric elements have been used for controlling electroluminescent arrays. No memory function is provided, however, and the maximum brightness of the display is accordingly limited.

Accordingly, it is an object of the present invention to provide a novel solid state display employing an array of solid state light emissive elements wherein a control circuit is employed for selectively controlling the emission state of each element, which circuit has relatively low power requirements and a high operating speed capability.

Another object of the invention is to provide a novel solid state display as above described wherein said control circuit includes a memory function which permits a high brightness display without requiring excessive power for the display elements.

It is another object of the invention to provide a novel solid state display as described wherein there is effected a matrix control of the display elements of said array.

A further object of the invention is to provide a novel solid state display of the above type wherein an electrical connection is not required between the control circuit and the display elements.

Still another object of the invention is to provide a novel solid state display wherein the light emissive elements are connected with photoresponsive means which are optically coupled to the control circuitry.

Yet another object of the invention is to provide a novel solid state display of the described type which is responsive to an electrical signal input.

A still further object of the invention is to provide a novel solid state display as above described in which the structure, as well as the voltage and current requirements of the circuit, are compatible with a microelectronic circuit fabrication.

Another object of the invention is to provide a novel solid state display wherein the display element array can be conveniently replaced.

Still another object of the invention is to provide a novel solid state display wherein the brightness and wavelength characteristics of the display energy can be adjusted independent of the control circuitry.

A further object of the invention is to provide a novel solid state display as above described wherein the display elements need not be of the same physical dimensions as the elements of the control circuit.

Yet a further object of the invention is to provide a novel solid state display which readily includes a multilevel operation and thereby obtains a gray scale definition in the display.

Basically, these and other objects of the invention are accomplished by employing a plurality of light emissive diodes connected in a matrix configuration, the light of which is coupled to the photoresponsive means of the display array for controlling the output thereof as a function of electrical signals applied to the diode matrix.

In accordance with one aspect of the invention, the light emissive diodes are preferably PSIN elements which exhibit a negative resistance characteristic and can be readily operated in a bistable switching mode. Electrical signals are applied through drive circuit means to row and column conductors connected to opposite sides of said PSIN diode elements for selectively switching the impedance state of said elements. For each PSIN diode there is provided a corresponding light emissive display corresponding diode elements of the PSIN diode matrix element and an associated photoresponsive element of the display array which are connected in pairs across an energizing potential source, and physically arranged in a row-column configuration. The photoresponsive elements are normally in a high impedance state for maintaining their associated display elements in the "off" state. In response to energization from the output of the impedances of the photoresponsive elements are reduced so as to turn the display elements "on."

In accordance with a further aspect of the invention a single PSIN diode element may be optically coupled to a plurality of photoresponsive elements wherein there need not be provided a critical physical alignment between the elements of the diode matrix and the elements of the display array.

In accordance with a still further aspect of the invention a multilevel operation is provided wherein a plurality of PSIN diode elements are optically coupled to a single photoresponsive element for obtaining a range of low impedance levels, thereby providing a gray scale definition in the display.

The specification concludes with claims particularly pointing out and distinctly claiming the subject matter which is regarded as the invention. It is believed, however, that both as to its organization and method of operation, together with further objects and advantages thereof, the invention may be best understood from the following description taken in connection with the accompanying drawings in which:

FIGURE 1 is a schematic block diagram of a solid state light emitting display in accordance with the invention;

FIGURE 2 is a schematic diagram of the circuit connections of the light emissive diode matrix network of FIGURE 1;

FIGURE 3 is a curve showing the voltage vs. current characteristics for typical PSIN diode devices that may be employed in the matrix of FIGURE 2;

FIGURE 4 is a schematic diagram of the circuit connections of the light emissive-photoresponsive array of FIGURE 1;

FIGURE 5 is a schematic diagram of one modified form of optical coupling that may be employed in the illustrated solid state display;

FIGURE 6 is a schematic diagram of a second modified form of optical coupling that may be employed in the illustrated solid state display;

FIGURE 7 is an expanded perspective view of the sandwich construction employed in one embodiment of the present invention;

FIGURE 8A, FIGURE 8B and FIGURE 8C are, respectively, front and back surface plan views and a cross-sectional view of the PSIN diode matrix structure.

FIGURES 9A and 9B are plan and cross-sectional views, respectively, of the photoconductor assembly layer of FIGURE 7; and FIGURES 10A and 10B are plan and cross-sectional views, respectively, of the electroluminescent assembly layer of FIGURE 7.

In FIGURE 1 there is illustrated in a basic block diagram a solid state light emitting display conforming to the present invention. The display includes a matrix network 1 having light emissive diodes that are selectively energized by electrical signal outputs to generate a light energy output which may or may not be in the visible portion of the spectrum. Each diode may be appreciated to act as a point source with respect to the generated output light pattern. An array 2 of light emissive-photoresponsive elements respond to the light output from matrix network 1 to controllably provide a relatively bright visible display. It is preferred that each diode element possess a memory property so that the applied information and the resulting display may be stored. The illustrated display system has the capability of providing television picture type displays, computer displays, and the like, wherein each display element is selectively controlled in conformance with a given input signal or signals.

As shown in the electrical circuit of FIGURE 2 in one exemplary embodiment of the matrix network 1 there is included a matrix 8 of light emissive diodes 9, preferably PSIN diodes, and a drive circuit 10. The diodes 9 are arranged in a column-row configuration, being connected at the intersections of column conductors 11, 12 and 13 and row conductors 14, 15 and 16. In series with each of the diodes is coupled a current limiting resistor 17. As shown, the PSIN diodes are connected so as to conduct current from the column conductors, through the resistors to the row conductors. The diode elements 9 exhibit a negative resistance characteristic and are made to perform in a bistable mode of operation, having stable high and low impedance states. The diodes are light emissive in their low impedance state. Although, for the purpose of simplicity in illustration only a limited number of diode elements are presented, it may be appreciated that for a complete display on the order of several hundred to many thousand diode elements may be employed.

The drive circuit 10 is employed to selectively control the operation of the individual diode elements 9. Drive circuit 10 includes a first plurality of transistor-diode gates 20, 21 and 22 connected to column conductors 11, 12 and 13, respectively, and a second plurality of transistor-diode gates 23, 24 and 25 connected to row conductors 14, 15 and 16, respectively. The transistor-diode gates are coupled to a source of D.C. potential, shown as a multiple tapped battery 26 having a positive end terminal 27, a negative end terminal 28, and intermediate terminal taps 29, 30, 31 and 32. Tap 30 is connected to ground. In the positive direction, the voltage between taps 31 and 30 is denoted as $V_a$, the voltage between taps 32 and 31 as $V_b$ and the voltage between taps 27 and 32 as $V_c$. In the negative direction, the voltage between taps 29 and 30 is denoted as $V_d$ and the voltage between taps 28 and 29 as $V_e$. As will be seen, different levels of voltage are selectively connected through the drive circuit 10 for controlling selected ones of the diode elements 9 in accordance with the applied input signals.

Terminals 31, 32 and 27 are selectively connected through column transistor-diode gates 20, 21 and 22 to to column conductors 11, 12 and 13. Terminals 30, 29 and 28 are similarly connected through row transistor-diode gates 23, 24 and 25 to the row conductors 14, 15 and 16. The column transistor-diode gates are identical, and the row transistor-diode gates are identical. Each gate includes three switching paths, the operation of which is controlled by a source 33 of logic inputs. Source 33, which may be a conventional tree logic component, shift register logic or other conventional logic component, typically supplies binary signals of "1's" and "0's" for turning the transistors on and off, respectively. It is noted that since the column gates include PNP transistors and the row gates include NPN transistors, the control signals applied are of opposite polarity.

In the first path of gate 20 extending between battery terminal 31 and column conductor 11 there is connected a single p-n signal diode 34, the cathode of which is tied to conductor 11 and the anode to terminal 31. The second path of gate 20 connects conductor 11 to terminal 32 and includes the series connection of a p-n signal diode 35 and a PNP transistor 36 operating as a switch, being either saturated or cut-off. The cathode of the diode 35 is connected to conductor 11, the anode connected to the collector of transistor 36 and the emitter thereof connected to terminal 32. The base electrode is connected to source 33 and is for the steady state condition biased with a "1" signal for causing the transistor to conduct.

The third path couples conductor 11 to battery terminal 27 and includes a switch operating PNP transistor 37, the collector of which is connected to conductor 11 and the emitter to terminal 27. The base electrode is connected to source 33 and has either a "1" or "0" applied. For a "1" applied to transistor 36 and a "0" to transistor 37, or a "1, 0" logic input, conduction occurs through the second path to connect terminal 32 to conductor 11. For a "0" applied to transistors 36 and 37, or a "0, 0" logic input, so that both transistors are cut off, conduction occurs in the first path through diode 34 to connect terminal 31 to conductor 11. For a "1, 1" or a "0, 1" logic input, conduction occurs through the third path to connect terminal 27 to conductor 11. Gates 21 and 22 are similarly connected and operated.

In transistor-diode gate 23 the first path extends between row conductor 14 and grounded terminal 30. This path includes a signal p-n diode 38, the anode of which is connected to conductor 14 and the cathode to terminal 30. The second path couples conductor 14 to terminal 29 and includes a signal p-n diode 39 and a switch operating NPN transistor 40, the anode of diode 39 connected to conductor 14, the cathode connected to the collector of transistor 40 and the emitter thereof connected to terminal 29. The base electrode of transistor 40 is connected to logic source 33. The third path couples conductor 14 to terminal 28 and includes a switch operating NPN transistor 41, the collector of which is connected to conductor 14, the emitter to terminal 28 and the base to source 33. Gates 24 and 25 similarly connect row conductors 15 and 16, respectively, to terminals 28, 29 and 30. The row transistor-diode gates function in the same manner as described with respect to the column transistor-diode gates.

Before considering the operation of the circuit of FIGURE 2, reference will be made to FIGURE 3 in which is presented the voltage vs. current characteristic for typical PSIN diode elements suitable for use in the circuit of FIGURE 2. There are also shown five load lines 101, 102, 103, 104 and 105 which are established for different applied source voltages $V_1$, $V_2$, $V_3$, $V_4$ and $V_5$, respectively, assuming a constant load impedance, which is principally provided by the resistor 17 in FIGURE 2. It is seen that for voltages $V_1$ and $V_5$ a monostable operation is provided at operating points $f$ and $g$, respectively, in the high impedance and low impedance states. Voltages $V_2$, $V_3$ and $V_4$ provide bistable operation at points $h$, $i$ and $j$ in the high impedance state and at points $k$, $l$ and $m$ in the low impedance state. From the figure it may be seen that if the diode is biased in the high impedance state at point $i$ for $V_3$, switching the voltage to $V_4$ will not change its state, whereas switching the voltage to $V_5$ so as to exceed the peak voltage of the characteristic curve shifts the operation to point $g$ and therefore places the diode in its low impedance state. Correspondingly, with the diode biased in its low impedance state at point $l$ by voltage $V_3$, shifting the voltage to $V_2$ will not change the impedance state, whereas shifting the voltage to $V_1$ so as to fall below the minimum voltage of the characteristic curve will switch the diode to its high impedance state at operating point $f$.

Typical peak voltages are 10 to 20 volts; typical minimum voltages are 3 to 6 volts; typical fixed bias voltages, corresponding to $V_3$ are 8 to 15 volts. For a load impedance of about one kilohm, the low impedance current is on the order of 3 to 7 milliamperes and the high impedance current several microamperes. For switching voltages on the order of 30% in excess of the peak voltage, switching times of about 0.1 microsecond may be obtained.

Considering now the operation of FIG. 2, with the diodes initially unenergized, closing of the second path alone in each of the column and row transistor-diode gates applies a normal bias or steady state condition to each of the PSIN diode elements. As noted, this is accomplished by applying a "1, 0" logic input to all of the column and row transistor-diode gates, i.e., "1" control signal to the transistors in the second path and a "0" control signal to the transistors in the third path. In each gate conduction through the signal diode in the first path is inhibited. Accordingly, in the steady state condition, the source voltage applied to each PSIN diode may be seen to be $V_a+V_b+V_d$. With this sum equated to the voltage $V_3$ in FIGURE 3, it is seen that the normally biased operating point for the dark condition corresponds to point $i$, at which point the diodes do not emit light. To switch a given diode "on" and thereby cause it to emit light, which is to perform the WRITE operation, a "1, 1" logic input is also applied to the pair of column and row gates which are connected to the column and row conductors across which said given diode is coupled. Although for this condition the second path transistor is biased for conduction, it is inhibited from doing so by the conduction of the third path transistor. Thus, during the WRITE operation, the source voltage applied to a PSIN diode for causing light emission is $V_a+V_b+V_c+V_d+V_e$. With this sum voltage equated to $V_5$ in FIGURE 3, it is seen that the operating point of said given diode switches momentarily to point $g$. Upon release of the WRITE input signal, conduction in the transistor-diode gates reverts back to the second path and the operating point moves to point $l$. This corresponds to the light steady state condition. It will remain in the low impedance state until switched back to the high impedance state, as will be seen presently.

It is noted that when switching a given diode from its high impedance state to its low impedance state, as was previously described, the diodes that are connected to the same row and column conductors as said given diode will have a half select voltage applied thereto which is insufficient to cause them to switch states. For example, the diodes in column with said given diode have an applied source voltage of $V_a+V_b+V_c+V_d$. If this sum voltage is said to correspond to voltage $V_4$ in FIGURE 3, it is seen that the operating point switches momentarily to point $j$, but is still in the high impedance state. Correspondingly, the source voltage applied to the diodes in row with the given diode is $V_a+V_b+V_d+V_e$, which may also be said to correspond to voltage $V_4$. It is noted that those diodes connected in column or row with said given diode which are already in the "on" condition will remain so, the operating point merely shifting momentarily from point $l$ to point $m$.

In order to switch said given diode to its high impedance or "off" condition, which is to perform the ERASE operation, a "0,0" logic input is applied to the pair of column and row gates which are connected to the column and row conductors across which said given diode is coupled. This permits the first path diodes in these gates to now conduct and thereby applies a source voltage of $V_a$ across said given diode. If it is assumed that $V_a$ corresponds to $V_1$ in FIGURE 3, the operating point is seen to switch from point $l$ to point $f$. Upon release of ERASE input, conduction is again in the second path transistors in the recited column and row gates, and the operating point will return to the dark steady state condition of point $i$. Any of the PSIN diodes in column or row with said given diode which are in the "on" condition will remain so since the source voltage applied thereto will be either $V_a+V_d+$ or $V_a+V_b$, both of which correspond to the half select voltage $V_2$ in FIGURE 3. For these diodes the operating point during the transient control signal will shift front point $l$ to point $k$.

By the proper application of control signals from source 33 to the various column and row transistor diode gates, "on-off" operation of the individual PSIN diodes of the diode matrix is effected. In accordance with the state of the art, the control signals can be readily generated at speeds in excess of several mHz. which is comparable to television operation.

With reference now to FIGURE 4, there is illustrated a schematic diagram of one exemplary embodiment of the circuit connections for the light emissive-photoresponsive array 2 of FIGURE 1. The circuit includes a plurality of electroluminescent elements 60 physically arranged in a column, row configuration. In the embodiment being considered there is a corresponding electroluminescent element 60 for each PSIN element 9 of the light emitting matrix in FIGURE 2. In series with each electroluminescent element is a photoconductor element 61 forming an electroluminescent-photoconductor pair, the photoconductors of each electroluminescent-photoconductor pair being optically coupled to respective ones of the PSIN diode elements of FIGURE 2, as indicated by the single optical arrows associated with the elements 9 and 61. For a proper operation of the display it is important that there be essentially no optical coupling between the electroluminescent and photoconductor elements of the display array so that the photoconductors be entirely under control of the diode matrix. The electroluminescent-photoconductor pairs are connected in shunt across a source 62 of alternating voltage. For a dark condition of the photoconductors, so that they are in a high impedance state, the voltage placed across the associated electroluminescent elements is insufficient to cause them to luminesce. In response to illumination of the photoconductors by the PSIN diode elements light coupled thereto, which drops their impedance, the associated electroluminescent elements have sufficient voltage placed thereacross to cause light emission. Accordingly, a display is provided by the array 2 which corresponds to the light emission from the light emitting matrix network 1, the display being both visible and relatively bright.

The voltage source 62 is typically 180 volts at one kHz. By way of example, the photoconductors have been fabricated from activated cadmium selenide or cadmium sulfoselenide, and the electroluminescent elements from activated zinc sulfide. Normal quantum gains for cadmium selenide photoconductors are 1000 to 2000 when irradiated by a PSIN source. Further, photon amplification provided by the display has been found to be on the order of 10 to 100. The response time of the electroluminescent-photoconductor pairs to change between light and dark states is sufficiently rapid so as to appear to the eye to be instantaneous.

The above noted high quantum gains and photon amplification is attributable to there being a separation of the memory or control function from the display components. Thus, relieved of any switching function, the photoconductors can be used in their most favorable mode, i.e., as a quantum gain element. Similarly, the electroluminescent elements function as light emitters only and are not part of a bistable or latching circuit. In addition, a greater freedom of excitation voltage and frequency is provided than in the case where the control circuity is electrically integral with the display circuitry.

In FIGURE 5 there is illustrated a modified optical coupling existing between the diode matrix and the display array. As shown, the light output from a single light emissive diode element 9' is coupled to a plurality of photoresponsive elements 61'. For such configuration it is not necessary to provide a precise alignment between the matrix elements and the display array elements.

In FIGURE 6 a further modified optical coupling is shown between a plurality of diode elements 9" and a single photoresponsive element 61" providing a multilevel operation and display having gray scale. The low impedance state of the element 61" can be controlled over a range of values by selectively lighting one or more of the diode elements 9" to accordingly control the intensity of light emitted by the electroluminescent element 60".

It will be noted at this point that, although a direct light coupling as illustrated will prove satisfactory for many applications, the optical path between the diode matrix and the display array in all embodiments of the invention may include a conventional lens system or optical fiber arrangement for improving the light coupling efficiency and for avoiding undesirable cross coupling.

The described solid state display is constructed in a sandwich configuration in accordance with one embodiment of the invention, such as shown in the expanded perspective view of FIGURE 7. The sandwich construction is comprised of a layer 70, corresponding to the PSIN diode matrix, a photoconductor assembly layer 71 and an electroluminescent assembly layer 72. In the operating embodiment illustrated, the electroluminescent, photoconductor layers are constructed integrally and combined with the PSIN diode matrix by a physical plug-in connection in which the PSIN diodes are aligned with the fabricated electroluminescent-photoconductor pairs. In an alternative embodiment the diode matrix may be physically spaced from the display array. As shown, the diode matrix includes a plurality of column conductors 73 and row conductors 74, the row conductors being shown as connected to one side of the PSIN diode devices 75. A source 76 of alternating voltage is connected to conductive portions of the electroluminescent, photoconductor layers, which connections are more clearly shown in FIGURES 9A and 10A.

In FIGURES 8A and 8B are presented plan views of the front and back surface of the PSIN diode matrix layer 70, and in FIGURE 8C is presented a cross-sectional view taken along the line 8c—8c. As shown in the cross-sectional view of FIGURE 8C, the diodes are fabricated from a wafer 80 of semi-insulating material, typically made from a gallium arsenide or mixed crystals of gallium arsenide and gallium phosphide. For each diode an n-type alloyed region 81 is formed upon the back surface of wafer 80. An ohmic contact 82 is connected to the alloyed-n-region. As shown in the back surface view of FIGURE 8B, the n-type alloyed region of each diode element is electrically connected to a common row conductor 74 through a resistor element 83. The elements 83, typically Nichrome resistors, and the row conductors are evaporated onto the surface of the wafer by conventional techniques.

Referring again to FIGURE 8C, the front surface of the wafer 80 has a thin p-type diffused region 84 formed thereat. As illustrated in FIGURE 8A, the p-type diffused regions are formed in columns on the wafer surface, each strip being common to a plurality of column diode elements. To each p-type diffused strip is connected an ohmic contact 85 connected to conductors 73. The p-type diffused strips may be fabricated by performing the diffusion process through a $S_iO_2$ mask. The high resistivity of the semi-insulating material, e.g., on the order of $10^7$–$10^8$ ohm-cm. for gallium arsenide, provide good electrical isolation between the PSIN diode elements.

Considering some operating characteristics of typical gallium arsenide PSIN diode elements that have been employed in an operating display, and referring again to FIGURE 3, under forward bias conditions the exhibited high impedance is the order of a megohm. As the bias is increased to the peak voltage, negative resistance begins to set in. Eventually a minimum voltage is reached where double injection of the current carriers occurs and the devices are converted into the low impedance state, exhibiting on the order of a few ohms. In the low impedance state light is emitted from a small region adjacent to the p-diffused layer and opposite to the n-alloyed region. The wavelength of the emitted light at room temperature is 8770° A.

A further description of the structure and fabrication process of PSIN diode elements, per se, is given in a copending application for U.S. Letters Patent entitled "Negative Resistance Light Emitting Solid State Diode Devices," Ser. No. 451,122, filed Apr. 27, 1965 by Ing et al., assigned to the assignee of the present invention.

In FIGURE 9A is shown a plan view of the photoconductor assembly layer 71 looking in the direction of the arrows 9a in FIGURE 7. A glass substrate 87 is provided upon which are deposited groups of interdigital conductors including a common ground conductor 88 and high voltage conductors 89. The conductors 89 are each connected to individual contacts 90. The common conductor 88 is connected to a common contact 91 which connects to one side of the applied A.C. voltage source. The conductors are typically made of platinum and are deposited onto the glass substrate. Overlaying the interdigital conductors are strips of photoconductive material 92. A cross-sectional view of the photoconductor assembly layer taken along the line 9b—9b is shown in FIGURE 9B.

In FIGURE 10A is shown a plan view of the electroluminescent assembly layer 72 looking in the direction of the arrows 10a in FIGURE 7. As shown in FIGURE 10A and the cross-sectional view of FIGURE 10B taken along the line 10b—10b, layer 72 is composed of a conventional transparent conductive layer 94, supported by a glass substrate 95 and having deposited thereon a layer of electroluminescent material 96. Deposited on the electroluminescent material are discrete contacts 97 which correspond to contacts 90 of the photoconductor assembly layer. Overlaying the layer 96 through which the contacts 97 protrude, is an electrical and optical insulating layer 98, typically a black Mylar material. In construction, the photoconductor assembly layer 71 and electroluminescent assembly layer 72 are pressed into intimate contact with the electrodes 97 and 90 making a good electrical connection. A contact 99, shown in FIGURE 10A, connects to the conductive layer 94 and to the opposite side of the applied A.C. voltage source.

Other photoresponsive devices may be employed in the display array, such as conventional photodiodes or phototransistors. Further, neither the diode matrix nor the display array need be in a regular geometrical configuration as illustrated, although often it is convenient to provide such configuration.

What we claim as new and desire to secure by Letters Patent of the United States is:

1. A solid state display system comprising:
  (a) an array of solid state light emissive-photoresponsive elements for generating a light output in response to a light input,
  (b) matrix means including a matrix of solid state bistable diode elements having low power and rapid response characteristics which in a first stable state are light emissive and in a second stable state are non light emissive, the output of said diode elements being optically coupled to said array of light emissive-photoresponsive elements, and
  (c) means for applying electrical input signals to said matrix for selectively operating said diode elements in said first and second states and thereby controlling the light output of said light emissive-photoresponsive elements.

2. A solid state display system as in claim 1 wherein said solid state diode elements are PSIN diodes exhibiting a relatively low impedance in said first stable and a relatively high impedance in said second stable state.

3. A solid state display system as in claim 2 wherein said array of light emissive-photoresponsive means comprises a plurality of shunt paths connected across a voltage source, each shunt path including an electroluminescent element serially connected with a photoresponsive element, the impedance state of the photoresponsive elements being adjusted in accordance with incident light energy from said matrix so as to determine the voltage applied across the associated serially connected electroluminescent elements.

4. A solid state display system as in claim 3 wherein for each PSIN diode element there is a corresponding pair of electroluminescent and photoresponsive elements, each diode element accordingly being coupled to a corresponding photoresponsive element.

5. A solid state display system as in claim 3 wherein the number of pairs of electroluminescent and photoresponsive elements exceeds the number of PSIN diode elements, each diode element accordingly being optically coupled to more than a single photoresponsive element.

6. A solid state display system as in claim 3 wherein the number of PSIN diode elements exceeds the number of pairs of electroluminescent and photoresponsive elements, more than a single diode element accordingly being optically coupled to each photoresponsive element so as to obtain a gray scale definition in said visible light output.

7. A solid state display system as in claim 3 wherein said matrix means includes an electrical circuit responsive to said input signals for selectively applying a pair of voltages to said PSIN diode elements for driving said elements into their high or low impedance state.

8. A solid state display system as in claim 4 wherein said array comprises a first layer of photoconductor elements and a second layer bonded together so as to form said plurality of shunt paths, said matrix being of unitary construction and positioned in proximity with said first and second layers.

9. A solid state display system as in claim 8 wherein the matrix of PSIN diode elements are arranged in a column and row configuration and said array of electroluminescent and photoconductor elements are similarly arranged in a column and row configuration.

References Cited

UNITED STATES PATENTS

| | | | |
|---|---|---|---|
| 2,965,802 | 12/1960 | Loebner. | |
| 2,997,596 | 8/1961 | Vize | 250—209 |
| 3,191,041 | 6/1965 | Wilmotte | 250—209 |
| 3,249,764 | 5/1966 | Holonyak | 307—299 |
| 3,343,128 | 9/1967 | Rogers. | |

RALPH G. NILSON, Primary Examiner

C. M. LEEDOM, Assistant Examiner

U.S. Cl. X.R.

250—217; 313—108; 317—235.27

PO-1050
(5/69)

UNITED STATES PATENT OFFICE
CERTIFICATE OF CORRECTION

Patent No. 3,479,517  Dated November 18, 1969

Inventor(s) Thomas E. Bray and Robert E. Glusick

It is certified that error appears in the above-identified patent and that said Letters Patent are hereby corrected as shown below:

In the drawings, Sheets 1, 2 and 3, and Column 1, line 4, the inventor "Robert E. Clusick" should read --Robert E. Glusick--. Column 9, line 61, after "stable" insert --state--. Column 10, line 14, after "being" insert --optically--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents